United States Patent [19]

Otsuzuki et al.

[11] Patent Number: 5,506,304
[45] Date of Patent: Apr. 9, 1996

[54] PROCESS FOR CONTINUOUSLY PREPARING RUBBER MODIFIED STYRENE RESINS

[75] Inventors: Shiro Otsuzuki; Mune Iwamoto; Akihiko Nakajima; Masato Takaku; Hisao Morita; Takao Kobayashi; Toshihiko Ando, all of Takaishi, Japan

[73] Assignee: Mitsui Toatsu Chemicals, Inc., Tokyo, Japan

[21] Appl. No.: 264,911

[22] Filed: Jun. 24, 1994

[30] Foreign Application Priority Data

| Jun. 29, 1993 | [JP] | Japan | 5-159217 |
| Jul. 29, 1993 | [JP] | Japan | 5-188448 |
| Apr. 14, 1994 | [JP] | Japan | 6-075812 |
| Apr. 15, 1994 | [JP] | Japan | 6-076901 |

[51] Int. Cl.⁶ ........................... C08L 55/02
[52] U.S. Cl. ........................... 525/53; 525/942
[58] Field of Search ........................... 525/53, 942

[56] References Cited

U.S. PATENT DOCUMENTS

| 3,337,650 | 8/1967 | Marcil | 525/53 |
| 3,658,946 | 4/1972 | Bronstert et al. | |
| 4,315,083 | 2/1982 | Burk | 525/53 |
| 4,393,171 | 7/1983 | Bracke et al. | 525/53 |
| 4,417,030 | 11/1983 | Aliberti et al. | 525/316 |
| 4,587,294 | 5/1986 | Matsubara et al. | 525/53 |
| 5,194,491 | 3/1993 | Sakita et al. | 525/314 |
| 5,210,132 | 5/1993 | Matsubara et al. | 525/53 |
| 5,244,977 | 9/1993 | Hayakawa et al. | 525/243 |
| 5,278,253 | 1/1994 | Baumgartner et al. | 525/316 |
| 5,349,012 | 9/1994 | Fujita et al. | 525/53 |

FOREIGN PATENT DOCUMENTS

| 1129139 | 8/1982 | Canada | 525/53 |
| 477764 | 4/1992 | European Pat. Off. | |
| 63-118315 | 5/1988 | Japan | |
| 4366116 | 12/1992 | Japan | |

*Primary Examiner*—Thomas Hamilton, III
*Attorney, Agent, or Firm*—Burns, Doane, Swecker & Mathis

[57] ABSTRACT

A process for continuously preparing rubber modified styrene resins from styrene monomers and acrylonitryle monomers in the presence of a rubbery polymer in accordance with a continuous mass and/or solution polymerization method by the use of serial polymerization device comprising two or more reactors; said process comprising (1) a first step of feeding a polymeric materials to the first reactor to carry out the polymerization of monomers in a condition where the rubbery polymer is not inverted to the dispersed phase, and a second step of adding a polymeric materials to second reactors to carry out the polymerization of the monomers and to thus invert the rubbery polymer to the dispersed phase,

(2) a ratio of the added materials to the materials used in the first step being in the range of from 10 to 220% by weight, whereby impact resistance and surface gloss can be remarkably improved.

18 Claims, 1 Drawing Sheet

FIG.1(a)
PLAN VIEW

FIG.1(b)
SECTIONAL VIEW

UNIT: mm

PROCESS FOR CONTINUOUSLY PREPARING RUBBER MODIFIED STYRENE RESINS

BACKGROUND OF THE INVENTION (a) Field of the Invention

The present invention relates to a process for preparing rubber modified styrene resins. More specifically, it relates to a process for preparing rubber modified styrene resins which can provide molded articles having excellent impact resistance and high surface gloss.

(b) Description of the Related Art

Rubber modified styrene resins has been manufactured by an emulsion polymerization method, a continuous mass polymerization method or a solution polymerization method. The rubber modified styrene resins prepared by the emulsion polymerization is excellent in a balance between impact resistance and surface gloss, but since this kind of modified styrene resins contains large amounts of impurities such as an emulsifying agent and a dispersant, its hue is bad and its manufacturing cost is high. In addition, at the time of the manufacture, a large amount of waste water is discharged, which has an adverse influence on the environment. On the other hand, with regard to rubber modified styrene resins obtained by the continuous mass polymerization method or the solution polymerization method, there are advantages such as less impurities, a low manufacturing cost and no waste water, but the balance between an impact resistance and surface gloss is insufficient.

As techniques for improving the balance between the physical properties of the rubber modified styrene resins obtained by the continuous mass polymerization method or the solution polymerization method, for example, the following methods are known.

Japanese Patent Publication No. 7343/1974 (which corresponds to U.S. Pat. No. 3,658,946) discloses a method in which prepolymerization is carried out in a first polymerization reactor in a condition where a rubbery polymer does not invert to a dispersed phase, and polymerization is then done in a second polymerization reactor to invert the rubbery polymer to the dispersed phase (a prepolymerization method). However, in the rubber modified styrene resins obtained by this method, the diameter of rubber particles which can be controlled even by a conventional technique is large, and when acrylonitrile is added to the polymerization system, the diameter of the rubber particles further increases, so that the physical properties of the resin deteriorate. The reasons why the physical properties deteriorate are that the smaller the diameter of the rubber particles is, the higher the surface gloss of the styrene resin is, and that the impact resistance appears specifically in a suitable particle diameter range peculiar to a certain resin.

As a method capable of solving such a problem, Japanese Patent Laid-open No. 118315/1988 has suggested that conversion in each of a prepolymerization reactor and a phase inversion reactor is controlled so that ratios of the solid contents in a polymerization solution in these reactors may be close to each other. However, this method comprises complex steps, and so operativity as a practical plant is poor. Moreover, when copolymerization with the acrylonitrile is carried out, the diameter of the rubber particles cannot be sufficiently controlled, and large rubber particles are formed, so that the physical properties deteriorate.

Japanese Patent Application Laid-open No. 7708/1991 (which corresponds to U.S. Pat. No. 5,244,977) discloses a method in which a high viscous rubbery polymer having a viscosity of 400 to 2000 cP in a 5 wt % styrene solution at 25° C. is used under the control of solid contents in a polymeric solution in a prepolymerization reactor and a phase inversion reactor. In this method, the rubbery polymer is scarcely dissolved in monomers at the time of the preparation of a polymeric material, and an operative problem such as the difficult stirring of the polymeric solution is present due to the high viscosity of the polymerization system. Furthermore, since extremely large rubber particles are formed, the improvement of the physical properties cannot be expected.

In EP Unexamined Publication No. 477764, another method has been suggested in which a polymerization temperature until phase inversion is maintained at 90° C. or less by the use of a plug-flow type polymerization reactor, and polymerization is then carried out in the presence of polybutadiene by the use of an organic peroxide having a high graft activity, i.e., a half-life period of 20 minutes or less at 90° C. to prepare a resin having a rubber particle diameter of 0.5 μm or less and a high graft ratio. However, in this method, the plug-flow type polymerization reactor is used in a phase inversion step, and thus it is impossible to strictly control the rubber particle diameter, so that giant rubber particles are partially formed and surface gloss is not sufficiently improved.

In the conventional techniques described above, the multi-reactor polymerization method using two or more reactors is employed, and in the first reactor, the polymerization is carried out under conditions where the rubbery polymer does not invert to the dispersed phase. Next, in the second reactor, the rubbery polymer is inverted to the dispersed phase. However, in the second and later reactors, a process of adding the polymeric material to the polymerization system has not been employed so far.

SUMMARY OF THE INVENTION

The present inventors have conducted research with the intention of solving the above problems, and as a result, a surprising fact has been found. That is to say, in preparing rubber modified styrene resins by a continuous mass polymerization method and/or a solution polymerization method, if after a step of carrying out polymerization under conditions where the rubbery polymer is not substantially inverted to a dispersed phase, a rubbery polymer is inverted to the dispersed phase simultaneously with or after the addition of a polymeric material comprising monomers for use in a polymerization reaction, the rubbery polymer, an inert organic solvent and the like, there can be obtained the rubbery modified styrene resins which can provide molded articles having a remarkably improved impact resistance and surface gloss. The present invention has now been completed on the basis of this finding.

That is to say, the present invention is directed to a process for continuously preparing rubber modified styrene resins from styrene monomers, acrylonitrile monomers and the like in the presence of a rubbery polymer in accordance with a continuous mass polymerization method and/or a solution polymerization method by the use of a serial polymerization device comprising two or more reactors; said process for continuously preparing rubber modified styrene resins comprising (1) a first step of feeding a polymeric material to the first reactor (hereinafter referred to as the first polymeric material) to carry out the polymerization of the monomers under conditions where the rubbery polymer is not substantially inverted to the dispersed phase, and a second step of adding a polymeric material to the second and later reactors (hereinafter referred to as the second polymeric material) to continuously carry out the polymerization of the monomers and to thus invert the rubbery polymer to the dispersed phase, (2) a ratio of the added materials to the materials used in the first step being in the range of from 10 to 220% by weight, whereby impact resistance and surface gloss can be remarkably improved. Main raw materials for polymerization (monomers, rubbery polymer and inert solvent) are referred to as "Polymeric material" in the present specification and claims.

BRIEF DESCRIPTION OF THE DRAWING

FIG. 1 shows the shape of a test piece used to evaluate the surface gloss of molded articles of rubber modified styrene resins obtained by the present invention, and FIG. 1 (a) is a plan view and FIG. 1 (b) is a sectional view.

DESCRIPTION OF THE PREFERRED EMBODIMENTS

As styrene monomers which can be used in the present invention, there is used an unsaturated aromatic compound, particularly styrene or its derivative represented by the formula [I]

(wherein $R^1$ is hydrogen, an alkyl group having 1 to 5 carbon atoms, or a halogen; and $R^2$ is hydrogen, an alkyl group having 1 to 5 carbon atoms, a halogen, or an unsaturated hydrocarbon having 1 to 5 carbon atoms, which may be the same or different). Examples of the styrene monomers include styrene, α-methylstyrene, o-methylstyrene, m-methylstyrene, p-methylstyrene, a halogenated styrene, t-butylstyrene, vinylxylene and divinylbenzene. Above all, styrene, α-methylstyrene, p-methylstyrene are preferably used, and styrene and α-methylstyrene are particularly preferably used. These styrene monomers can be used singly or in combination.

The amount of styrene monomers is usually in the range of from 25 to 97 parts by weight, preferably from 50 to 95 parts by weight with respect to 100 parts by weight of the total weight of the respective monomers in the polymeric material.

Acrylonitrile monomer which can be used in the present invention is an unsaturated compound having a nitrile group represented by the formula [II]

(wherein $R^1$ is as defined above). Examples of acrylonitrile monomers include acrylonitrile, methacrylonitrile and α-chloroacrylonitrile, and particularly preferable are acrylonitrile and methacrylonitrile. These acrylonitrile monomers can be used singly or in combination. The amount of acrylonitrile monomers to be used is usually in the range of from 3 to 45 parts by weight, preferably from 10 to 35 parts by weight with respect to 100 parts by weight of the total weight of the respective monomers in the polymeric material.

As an unsaturated compound monomer capable of copolymerizing with the styrene monomers and/or the acrylonitrile monomers which can be used in the present invention, there can usually be used known unsaturated compounds capable of copolymerizing with styrenes and acrylonitriles. Examples of the unsaturated compound monomer include alkyl (meth)acrylate monomers such as methyl methacrylate, ethyl methacrylate, methyl acrylate, ethyl acrylate and n-butyl acrylate, maleimide monomers such as n-phenylmaleimide, n-methylphenylmaleimide, n-cyclohexylmaleimide and n-ethylmaleimide, and unsaturated carboxylic acid derivatives such as maleic anhydride, acrylic acid and methacrylic acid. These unsaturated compound monomers are not always used, or they may be used singly or in combination.

Among these unsaturated compound monomers, methyl methacrylate, n-phenylmaleimide and maleic anhydride are particularly preferable. When methyl methacrylate is used, the hardness of an obtained resin can be improved; when n-phenylmaleimide is used, heat resistance can be improved; and when maleic anhydride is used, heat resistance and weathering resistance can be improved. Each of these unsaturated compound monomers can be used in the range of from 0 to 30 parts by weight with respect to 100 parts by weight of the total weight of the respective monomers in the polymeric material.

Preferable examples of a rubbery polymer which can be used in the present invention include polybutadiene, isoprene-butadiene copolymer, styrene-butadiene copolymer, acrylonitrile-butadiene copolymer, ethylene-propylene copolymer and ethylene-propylene-diene copolymer. More preferable are polybutadiene and styrene-butadiene copolymer. With regard to the styrene-butadiene copolymer, a styrene-butadiene block copolymer in which a styrene moiety and a butadiene moiety are separated from each other is particularly preferable. A solution viscosity of the rubbery polymer is in the range of from 3 to 200 cP, preferably from 3 to 100 cP, more preferably from 5 to 50 cP, as measured in a styrene solution having a rubbery polymer concentration of 5% by weight. The amount of the rubbery polymer to be used is usually in the range of from 4 to 50 parts by weight, preferably from 4 to 20 parts by weight with respect to 100 parts by weight of the total weight of the respective monomers in the polymeric material.

In the present invention, a polymerization initiator is preferably used. Examples of the polymerization initiator include organic peroxides such as benzoyl peroxide, lauroyl peroxide, t-butyl peroxypivalate, t-butyl peroxybenzoate, t-butyl peroxyisobutyrate, t-butyl peroxyoctoate, cumyl peroxyoctoate and 1,1-bis(t-butylperoxy)- 3,3,5-trimethylcyclohexane, and azo compounds such as 2,2-azobisisobutyronitrile, 2,2 -azobis(2-methylbutyronitrile) and 2,2-azobis(2,4-dimethylvaleronitrile). However, the organic peroxide is more preferable, because its employment easily leads to a high graft efficiency. Furthermore, the polymerization initiator to be used can be selected in consideration of the temperature of a reactor to which the polymerization initiator is added, the average residence time of a polymeric solution and a desired polymerization conversion. For example, in the case that the organic peroxide is used as the polymerization initiator, the polymerization initiator can be selected on the basis of its half-life period. It is preferred to use an organic peroxide having a half-life period of from 1 minute to 2 hours at 90° C. in the case that the polymerization is carried out at 50°–100° C., an organic peroxide having a half-life period of from 10 minutes to 20 hours at 90° C. in the case that the polymerization is carried out at 70°–140° C., or an organic peroxide having a half-life period of 5 hours or more at 90° C. in the case that the polymerization is carried out at 120°–180° C. Preferable examples of the organic peroxide include t-butyl peroxypivalate, t-butyl peroxy(2-ethylhexanoate) and 1,1-bis(t-butylperoxy)-3,3,5-trimethylcyclohexane, and particularly preferable are t-butyl peroxy(2-ethylhexanoate) and 1,1-bis(t-butylperoxy)-3,3,5-trimethylcyclohexane. The amount of the polymerization initiator to be used is usually in the range of from 0.001 to 5.0 parts by weight, preferably from 0.001 to 3.5 parts by weight, more preferably from 0.001 to 2.0 with respect to 100 parts by weight of the total weight of the respective monomers in the polymeric material. In the present invention, it is preferred that the polymerization initiator is divided into two portions for the first step and the second step, and they are then used. In this case, in the first step, the amount of the organic peroxide to be added is in the range of from 0.001 to 2.0 parts by weight, preferably from 0.001 to 1.0 part by weight with regard to 100 parts by weight of the monomers, and in the second step, the amount of the organic peroxide to be added is in the range of from 0 to 1.5 parts by weight, preferably from 0 to 1.0 part by weight with regard to 100 parts by weight of the monomers.

An inert organic solvent which can be used in the present invention means a compound not having any polymerizable unsaturated bond, and examples of the inert organic solvent include benzene, toluene, xylene, ethylbenzene, acetone, isopropylbenzene and methyl ethyl ketone, and particularly preferable are ethylbenzene and toluene. If a large amount of the inert organic solvent is used, the polymerization rate is inhibited, so that productivity deteriorates. In addition, in the case that the rubbery polymer is inverted into the dispersed phase, the particles of the rubbery polymer are liable to cohere during the polymerization. Moreover, due to the chain transfer properties of the inert organic solvent, the polymerization of the monomers to the rubbery polymer, i.e., a graft polymerization is disturbed, if a large amount of the inert organic solvent is used. Therefore, in the reactor in which the rubber is granulated, the amount of the inert organic solvent to be used is usually from 5 to 50 parts by weight, preferably from 10 to 30 parts by weight, more preferably from 18 to 30 parts by weight with respect to 100 parts by weight of the total weight of the respective monomers in the polymeric material. In the first step, the addition of the inert organic solvent is not necessary, but in the second step, the inert organic solvent is preferably added, and the addition of the inert organic solvent makes the control of the polymerization reaction easy and the viscosity of the polymeric solution lower. In consequence, the transfer of the polymeric solution and the like is easy, so that the operativity of the manufacturing process becomes good and the adjustment of a molecular weight also becomes possible.

In the present invention, for the sake of the adjustment of the molecular weight of the styrene-acrylonitrile copolymer, various kinds of known chain transfer agents can be used. For example, known chemical compounds such as t-dodecyl mercaptan, n-dodecyl mercaptan and n-octyl mercaptan can be used. The chain transfer agent can also be divided into two portions, and they can be then added to the first step and the second step. The amount of the chain transfer agent to be added depends upon its chain transfer ability and the desired molecular weight of an obtained product, but it is usually in the range of from 0.01 to 2.0 parts by weight with respect to 100 parts by weight of the total weight of the respective monomers in the polymeric material.

The reactors which are used in the present invention are not limited to specific type reactors, but for example, complete mixing type reactors, tube type or column type reactors can be used. As the reactor which can be used in the phase inversion step, the complete mixing type reactor is preferable, because of being easy to control the diameter of the formed rubber particles and having a high ability to uniformly mix the polymeric solution. The number of the reactors which can be used in the present invention is preferably two or more, particularly preferably in the range of from 2 to 5 in both of the first step and the second step.

In order to carry out stirring for the polymerization reaction, known stirring blades such as a paddle blade, a turbine blade, a propeller blade, a pfaudlar blade, a lattice blade, a gate blade and a helical ribbon blade can be used, and they can be used singly or in combination. Furthermore, they can also be used in the form of a single-stage blade or a multi-stage blade. The rotational speed of the stirring blade depends upon the volume of the reactor, the viscosity of the polymeric solution, required shearing force and the like, but it is usually in the range of from 10 rpm to 600 rpm.

The temperature of the first step is in the range of from 50° to 140° C., preferably from 50° to 110° C., and that of the second step is in the range of from 50° to 180° C., preferably from 50° to 140° C. When the second step utilizes the inversion reactor and one or more polymerization reactors as later polymerization reactors, the temperature of the first inversion reactor is in the range of from 50° to 140° C., preferably from 80° to 120° C. for the sake of the control of the formed rubber particles, and that of the later reactors is in the range of from 50° to 180° C., preferably from 100° to 140° C.

In the present invention, an average residence time in each step is usually suitably in the range of from 0.2 to 5 hours. If the average residence time is less than 0.2 hour, a phenomenon takes place in which the polymeric material passes through the reactor without being sufficiently polymerized, so that a product having poor physical properties is obtained. If the average residence time is more than 5 hours, production diminishes, the manufacturing cost of the resin increases, and productivity deteriorates.

In the first step, the monomers are polymerized in a condition where the rubbery polymer is not substantially inverted to the dispersed phase. In the present invention, the condition where the rubbery polymer is not substantially inverted to the dispersed phase means a condition where the rubbery polymer forms a continuous phase and the styrene-acrylonitrile copolymer forms the dispersed phase in the polymeric solution, and this fact can be easily confirmed by observing the polymeric solution with a optical microscope. Next, an exemplary procedure for keeping the condition where the rubbery polymer is not substantially inverted to the dispersed phase will be described.

In general, a main factor by which the rubbery polymer is inverted to the dispersed phase is a volume ratio of the rubbery polymer to the produced styrene-acrylonitrile copolymer, and for example, if the volume of the styrene-acrylonitrile copolymer exceeds 230% of that of the rubbery polymer in the polymeric solution, the phase inversion takes place. Therefore, it is preferable to control the volume of the polymer produced in the first step in the range of from 10 to 230%, preferably 50 to 200%, more preferably 100 to 150 of the volume of the rubbery polymer in the polymeric solution. However, the determination of the volume ratio of the rubbery polymer to the styrene-acrylonitrile copolymer is not practical, and so in general, a weight ratio of the rubbery polymer to the styrene-acrylonitrile copolymer is controlled.

It can be presumed that this weight ratio substantially corresponds to the above volume ratio.

The polymerization temperature in the first step is in the range of from 50° to 140° C., preferably from 50° to 110° C. If the polymerization temperature is less than 50° C., the polymerization rate is inhibited, so that productivity deteriorates, and if it is more than 140° C., a graft polymerization scarcely occurs, so that impact resistance declines. The average residence time in the first step is suitably in the range of from 0.2 to 5 hours, as a usual case.

In order to inhibit the polymerization of the monomers in the first step so that the volume of the obtained polymer may be in the range of from 10 to 230% of the volume of the rubbery polymer, the polymerization rate in the first step should be controlled by a known polymerization rate control technique of suitably selecting the polymerization temperature, the kind and the concentration of polymerization initiator, and the like so as to maintain the volume ratio of the produced styrene-acrylonitrile copolymer to that of the rubbery polymer in the above range.

As a technique for controlling the polymerization rate, the polymerization rate Rp can be calculated from the following formula, as described in P. J. Flory, "Principles of Polymer Chemistry", Japanese Edition, p. 101–125, Chap. 4, "Polymerization Reaction of Unsaturated Monomers by Free Radical Mechanism", particularly on page 108 thereto.

The polymerization reaction proceeds in accordance with the following reaction formulae:

| Initial reaction: | $I \rightarrow 2R\cdot$ |
| --- | --- |
| | $R\cdot + R - M$ |
| Propagation reaction: | $M_x\cdot + M \rightarrow M_{x+1}\cdot$ |
| Termination reaction: | $M\cdot + M\cdot \rightarrow P$ |

The polymerization rate can be determined from the following formula:

$$R_p = k_p[M\cdot][M] = k_p(fk_d[I]/k_t)^{1/2}[M]$$

| $k_p$: | Rate constant |
| --- | --- |
| $k_d$: | Initiator decomposition constant |
| $k_t$: | Termination rate constant |
| [I]: | Initiator concentration |
| f: | Initiator efficiency |
| [M]: | Monomer concentration |

For the calculation of the polymerization rate, $k_p$ (t), $k_d$ (t) and f of the monomers and the initiator to be used are determined by experiments or from literature values. After the decision of a desired conversion and average residence time, a combination of the initiator concentration and the polymerization temperature suitable for the decided values can be calculated, whereby conditions for suppressing the inversion in the first reactor can be set. According to this manner, a person skilled in the art can easily calculate the polymerization rate.

The polymeric solution continuously drawn from the first step is continuously fed to the first reactor of the respective reactors constituting the second step.

The process of the present invention comprises the first step in which the above polymeric material is fed to the first reactor, and the monomers are polymerized in the condition where the rubbery polymer is not substantially inverted to the dispersed phase; and the second step in which the polymeric material is added to the second and later reactors to continue the polymerization of the monomers, thereby inverting the rubbery polymer to the dispersed phase.

In the second step, at least one of the inert organic solvent, the monomers and the rubbery polymer as well as if necessary, the polymerization initiator and the chain transfer agent are added to a pipe for the polymeric solution coming from the first step or another pipe which is the first reactor constituting the second step. In this case, it is important that the ratio of the second polymeric material to the first polymeric material is in the range of 10 to 220% by weight.

The ratio of the second polymeric material to the first polymeric material is in the range of from 10 to 220% by weight, preferably from 25 to 220% by weight, more preferably from 25 to 160% by weight.

If the above ratio is in excess of 10% by weight, it is easy to control the shape of the rubbery polymer particles in the second step, and the surface gloss of molded articles is conveniently high. If the above ratio is less than 220% by weight, the sufficient amount of the polymeric solution can be drawn from the first step, and the graft polymer produced in the first step can possess a suitably high concentration. Thus, the effect of the graft polymer produced in the first step can be conveniently sufficiently utilized.

The second polymeric material to be added is at least one of the inert organic solvent, the monomers and the rubbery polymer. In particular, (A) in the case that the second polymeric material comprises the inert organic solvent and the monomers, the concentration of the rubbery polymer is high and that of the inert organic solvent is low in the first step, and so a graft reaction proceeds in the first step to obtain the resin having high gloss and high impact resistance. (B) In the case that the second polymeric material comprises the monomers and the rubbery polymer, the concentration of the inert organic solvent is high in the first step, and so the molecular weight of the copolymer produced in the first step can be decreased to obtain a resin having excellent fluidity. (C) In the case that the second polymeric material comprises the inert organic solvent and the rubbery polymer, the concentration of the inert organic solvent is low in the first step, and so a graft hindrance reaction by the inert solvent in the first step can be prevented to obtain a resin having high impact resistance. (D) In the case that the second polymeric material comprises the monomers, the inert organic solvent and the rubbery polymer, the obtained resin has a performance in the middle of the above (A) to (C) in compliance with its composition, and a balance of the desired impact strength, surface gloss and fluidity can be optionally controlled. The amount of the second polymeric material to be added can be denoted with various expressions, but they are not inconsistent, so long as they are in the range of from 10 to 220% by weight.

Detailed reference will be made to the amount of the second material to be added in the present invention.

(1) A case where the monomers are added as the second polymeric material:

Assuming the ratio of the rubbery polymer to the polymeric solution in the first step to be X% by weight, and assuming the ratio of the rubbery polymer to the polymeric solution in the second step to be Y% by weight, the second polymeric material is added in an amount in a range meeting the formula I (No. 1), preferably the formula II (No. 2):

(No. 1) $0.3 \leq Y/X \leq 0.9$      I (No. 2) $0.4 \leq Y/X \leq 0.75$      II In this case, the rubbery polymer is not added to the second step, and the amount of the second polymeric material to be added is determined on the basis of the weight of the rubbery polymer. The same can be applied to the case that the inert organic solvent alone is added, and the case that the monomers and the inert organic solvent are added.

Needless to say, it is also possible to simultaneously add the rubbery polymer.

(2) A case where the monomers are added as the second polymeric material:

Assuming the ratio of the inert organic solvent to the polymeric solution in the first step to be S% by weight, and assuming the ratio of the inert organic solvent to the polymeric solution in the second step to be T% by weight, the second polymeric material is added in an amount in a range meeting the formula III (No. 3), preferably the formula IV (No. 4), more preferably the formula V (No. 5):

(No. 3) $1.1 \leq S/T \leq 2.5$     III (No. 4) $1.18 \leq S/T \leq 2.5$     IV (No. 5) $1.25 \leq S/T \leq 2.5$     V In this case, the inert organic solvent is not added to the second step, and the amount of the second polymeric material to be added is determined on the basis of the weight of the inert organic solvent. Thus, the same can be applied to the case that the monomers are added to the second step, and the case that the monomers and the rubbery material are added thereto. Compared with the case (1), this case (2) has a feature that fluidity is particularly good.

(3) A case where the inert organic solvent is added:

Assuming the ratio of the inert organic solvent to the polymeric solution in the first step to be S% by weight, and assuming the ratio of the inert organic solvent to the polymeric solution in the second step to be T% by weight, the second polymeric material is added in an amount in a range meeting the formula VI (No. 6), preferably the formula VII (No. 7), more preferably the formula VIII (No. 8):

(No. 6) $0 \leq S/T \leq 0.6$     VI (No. 7) $0 \leq S/T \leq 0.5$     VII (No. 8) $0 \leq S/T \leq 0.4$     VIII The addition of the second material in the present invention tends to raise the concentration of the inert organic solvent in the second step higher than that of the inert organic solvent in the first step by the addition of the inert organic solvent in the second step. To the first step, styrene monomers, acrylonitrile monomers, the unsaturated compound monomers capable of copolymerizing with these monomers and the rubbery polymer are fed, if necessary, together with the inert organic solvent, the polymerization initiator and the chain transfer agent. Here, assuming the ratio of the inert organic solvent to the polymeric solution in the first step to be S% by weight, the value of S meets usually $0 \leq S \leq 20$, preferably $0 \leq S \leq 15$, more preferably $0 \leq S \leq 10$. Here, assuming the ratio of the inert organic solvent to the polymeric solution in the second step to be T% by weight, it is necessary in the present invention that the amounts of the inert organic solvent, and if necessary, the monomers, the rubbery polymer, the polymerization initiator and the chain transfer agent are controlled so as to meet the ratio of S to T, i.e., $0 \leq S/T \leq 0.6$, preferably $0 \leq S/T \leq 0.5$, more preferably $0 \leq S/T \leq 0.4$. If this ratio is more than 0.6, giant rubber particles are formed in the rubber particles, and the surface gloss noticeably declines. The cause of such a phenomenon is not apparent, but it can be presumed that a difference between graft polymerizabilities to the rubbery polymer in the first and second steps has an influence on the product.

The ratio of the inert organic solvent to the polymeric solution in the second step, i.e., T% by weight usually meets $5 \leq T \leq 50$, preferably $10 \leq T \leq 30$, more preferably $15 \leq T \leq 25$. In the case that T is 50% by weight or more, the giant rubber particles are formed by the cohesion of the once dispersed rubbery polymer particles, so that the surface gloss declines. In addition, the content of the monomers in the polymer system is low, and productivity is also low. On the other hand, if T is low, it is difficult to control a polymerization rate. If the polymerization is not controlled, the viscosity of the polymeric solution is excessively high, so that the shape of the rubbery polymer particles cannot be controlled any more. On the other hand, if the polymerization does not proceed, the viscosity of the polymeric solution is conversely too low, so that the diameter of the formed rubber particles increases. As understood from the foregoing, the polymerization ratio and the diameter of the rubber particles are closely connected with each other, and the poor control of the polymerization ratio is not preferable in the manufacturing process of an ABS resin.

(4) A case where the monomers and the inert organic solvent are added:

Assuming the ratio of the rubbery polymer to the polymeric solution in the first step to be X% by weight, and assuming the ratio of the rubbery polymer to the polymeric solution in the second step to be Y% by weight, the second polymeric material is added in an amount in a range meeting the formula IX (No. 9), preferably the formula X (No. 10), more preferably the formula XI (No. 11):

(No. 9) $0.3 \leq Y/X \leq 0.9$     IX (No. 10) $0.3 \leq Y/X \leq 0.8$     X (No. 11) $0.4 \leq Y/X \leq 0.75$     XI Assuming the ratio of the inert organic solvent to the polymeric solution in the first step to be S% by weight, and assuming the ratio of the inert organic solvent to the polymeric solution 100 in the second step to be T% by weight, the second polymeric material is added in an amount in a range meeting the formula XII (No. 12), preferably the formula XIII (No. 13), more preferably the formula XIV (No. 14):

(No. 12) $0 \leq S/T \leq 0.6$     XII (No. 13) $0 \leq S/T \leq 0.5$     XIII (No. 14) $0 \leq S/T \leq 0.4$     IX In the case that the monomers and the inert organic solvent are added, a resin can be characteristically obtained which has an excellent balance between surface gloss and impact resistance.

As described above, the addition of the second polymeric material can be carried out by any of various other manners, and the addition of the second polymeric material can be used to confirm means and control for setting the ratio of the second polymeric material to the first polymeric material in the range of 10 to 220% by weight, if the concentrations and the like of the respective materials are measured.

In the process of the present invention, the rubbery polymer is inverted to the dispersed phase by the shearing of the polymeric solution caused by the polymerization of the monomers and the stirring in the second step. This phase inversion can be achieved in the optional reactor constituting the second step on the basis of the control of the polymerization conversion of the monomers usually carried out by a continuous mass polymerization method or a solution polymerization method and the control of a stirring rotational speed in the reactor. The polymerization in the second step is carried out in the temperature range of from 80° to 180° C., preferably from 80° to 140° C. If the polymerization temperature is less than 80° C., the polymerization rate is low, so that the productivity declines, and if it is more than 180° C., a low-molecular styrene-acrylonitrile copolymer is produced in large quantities, and the heat resistance of the product decreases inconveniently. In the reactor in which the phase inversion is achieved, the polymerization is continued until a desired polymerization conversion of preferably 25 to 42% by weight, more preferably 35 to 42% by weight has been reached, and in the later reactors, the polymerization is continued until a polymerization conversion of 42 to 70% by weight, preferably 50 to 65% by weight has been reached by the polymerization.

No particular restriction is put on the subsequent steps, and rubber modified styrene resins is prepared via a volatile component removal step in which the remaining monomers and solvent are removed, and an extrusion step, which are usually carried out in the continuous mass polymerization method or the solution polymerization method. In the present invention, the average particle diameter of the rubbery polymer particles contained in the obtained rubber modified styrene resin is usually controlled in the range of from 0.2 to 2.5 µm, preferably from 0.2 to 1.4 µm, more preferably from 0.2 to 0.9 µm. A way for measuring the diameter of the rubbery polymer particles will be described in Example 1. If the average particle diameter of the rubbery polymer particles is less than 0.2 µm, the surface gloss is high but the impact resistance is low, and if it is more than 2.5 µm, both of the impact resistance and the surface gloss are low.

The employment of rubber modified styrene resins of the present invention makes it possible to prepare molded articles having improved impact resistance and surface gloss than conventional molded articles. In the present invention, the reason why both of the impact resistance and the surface gloss are improved is not definite, but in view of the fact that the amount of the graft in rubber modified styrene resins, i.e., the amount of the styrene-acrylonitrile copolymer occluded in the rubbery polymer contained in rubber modified styrene resins or bonded to the rubbery polymer increases, it can be presumed that an interfacial tension between the rubbery polymer and the styrene-acrylonitrile copolymer deteriorates by graft chains, so that the diameter of the rubbery polymer particles decreases and the surface gloss of the molded articles is improved. On the other hand, it can also be presumed that an adhesive strength between the rubbery polymer and the styrene-acrylonitrile copolymer increases by the graft chains, so that the impact resistance is improved. In addition, according to the present invention, a large amount of the second polymeric material can be added to the polymerization system, and therefore the polymerization in the second step et seq. can be inhibited to increase the rubber concentration in the product.

Rubber modified styrene resins according to the present invention can be used as structural materials of electric appliances such as electric washing machines, air conditioners, electric refrigerators and audio-visual equipment; general machines such as office automation equipment, telephones and musical instruments; miscellaneous goods such as toys, cosmetic containers and sheets; cars and housing materials. Hence, rubber modified styrene resins of the present invention have an extremely large industrial value.

Now, the present invention will be described in more detail with reference to examples, but the scope of the present invention should not be limited to these examples.

EXAMPLE 1

In experiments of Examples 1 to 3, monomers and ethylbenzene were added to a second polymerization reactor, but rubbery-polymer was not added thereto.

Rubber modified styrene resins was prepared by the use of a serial polymerization device having a volume about 15 liters in which 3 complete mixing type reactors were connected in series. A first step was constituted of a first reactor, and a second step was constituted of a second reactor and a third reactor. A first material comprising 48 parts by weight of styrene, 16 parts by weight of acrylonitrile, 20 parts by weight of ethylbenzene, 16 parts by weight of a rubbery polymer, 0.15 part by weight of t-dodecyl mercaptan and 0.03 part by weight of 1,1-bis(t-butylperoxy)-3,3,5-trimethylcyclohexane was continuously fed to the first reactor at 5.0 kg/hr by the use of a plunger pump, and the monomers were polymerized therein. In this case, a polymerization temperature was adjusted so that a solid content at the outlet of the first reactor, i.e., the amounts of the rubbery polymer and a styrene-acrylonitrile copolymer in a polymeric solution might be 32% by weight with respect to the weight of the polymeric solution. At this time, the polymerization temperature was 90° C. Furthermore, a stirring rotational speed in the reactor was 100 rpm, and the polymerization temperatures were measured by thermocouples arranged at 3 positions of upper, middle and lower positions of the reactor. In this case, the temperatures at the 3 points were controlled in the range of an average ±0.2° C., and it could be presumed that the polymeric solution was uniformly mixed. As the rubbery polymer, there was used a styrene-butadiene block copolymer having a viscosity of 11 cP in a styrene solution having a rubbery polymer concentration of 5% by weight at 25° C. (trade name NIPOL: NS310S, made by Nippon Zeon Co., Ltd.).

In the first reactor, rubbery polymer particles were not formed. In the first reactor, a weight ratio of the rubbery polymer to the styrene-acrylonitrile copolymer was 16:16.

The polymeric solution was continuously taken out from the first reactor, and then continuously fed to the second reactor. Next, a second material comprising 60 parts by weight of styrene, 20 parts by weight of acrylonitrile, 20 parts by weight of ethylbenzene, 0.15 part by weight of t-dodecyl mercaptan and 0.03 part by weight of 1,1-bis(t-butylperoxy)-3,3,5-trimethylcyclohexane was continuously fed to the second reactor at 5.0 kg/hr by the use of the plunger pump. In this case, 1,1-bis(t-butylperoxy)-3,3,5-trimethylcyclohexane alone was fed through another line. Here, a ratio between the amounts of an ethylbenzene in the first reactor and the second reactor (S/T) was 1. On the other hand, a ratio between the amounts of a rubbery polymer in the first reactor and that the second reactor was 0.5. In the second reactor, the polymerization of the monomers was continuously carried out, and the polymerization temperature was adjusted so that the solid content at the outlet of the second reactor might be 36% by weight with respect to the weight of the polymeric solution. At this time, the polymerization temperature was 90° C. In the second reactor, the rubbery polymer was inverted to a dispersed phase to form the rubbery polymer particles. The polymeric solution continuously drawn from the second reactor was fed to the third reactor, and the polymerization in the third reactor was carried out so that the solid content at the outlet of the third reactor might be 50% by weight. Next, the polymeric solution was passed through a volatile component removal step and an extrusion step to form pellets.

With regard to rubber modified styrene resins, polymerization conditions and the results of analysis and performance evaluation are shown in Table 1. This resin is more excellent in surface gloss as well as practical impact strength at positions A and B of a molded article shown in FIG. 1, as compared with the results of the undermentioned comparative examples.

The above analysis and performance evaluation of the resin were carried out by the following procedures.

(a) Amount of the rubber in the resin: The amount of the rubber dissolved in the first material was calculated from a material balance among the feed of the first material, the feed of the second material and the solid content in the third reactor.

(b) Average diameter of the rubber particles: A photograph of the resin was taken in accordance with an ultra-thin slice method by an electron microscope, and the particle diameters of 500 to 700 rubber particles in the photograph were measured. An average diameter of the rubber particles was calculated in accordance with the following formula x:

$$\text{Average diameter of the rubber particles} = \Sigma n D^4 / \Sigma n D^3 \quad \text{x}$$

wherein n is the number of the rubber particles having a particle diameter D.

(c) Preparation of test pieces: The obtained resin was dried at 90° C. for 3 hours, and then injection-molded at a molding temperature of 240° C. and a mold temperature of 40° C. to prepare test pieces for the measurement of Izod impact strength and test pieces for the measurement of practical impact strength having a shape shown in FIG. 1.

Figures 1A, 1B:
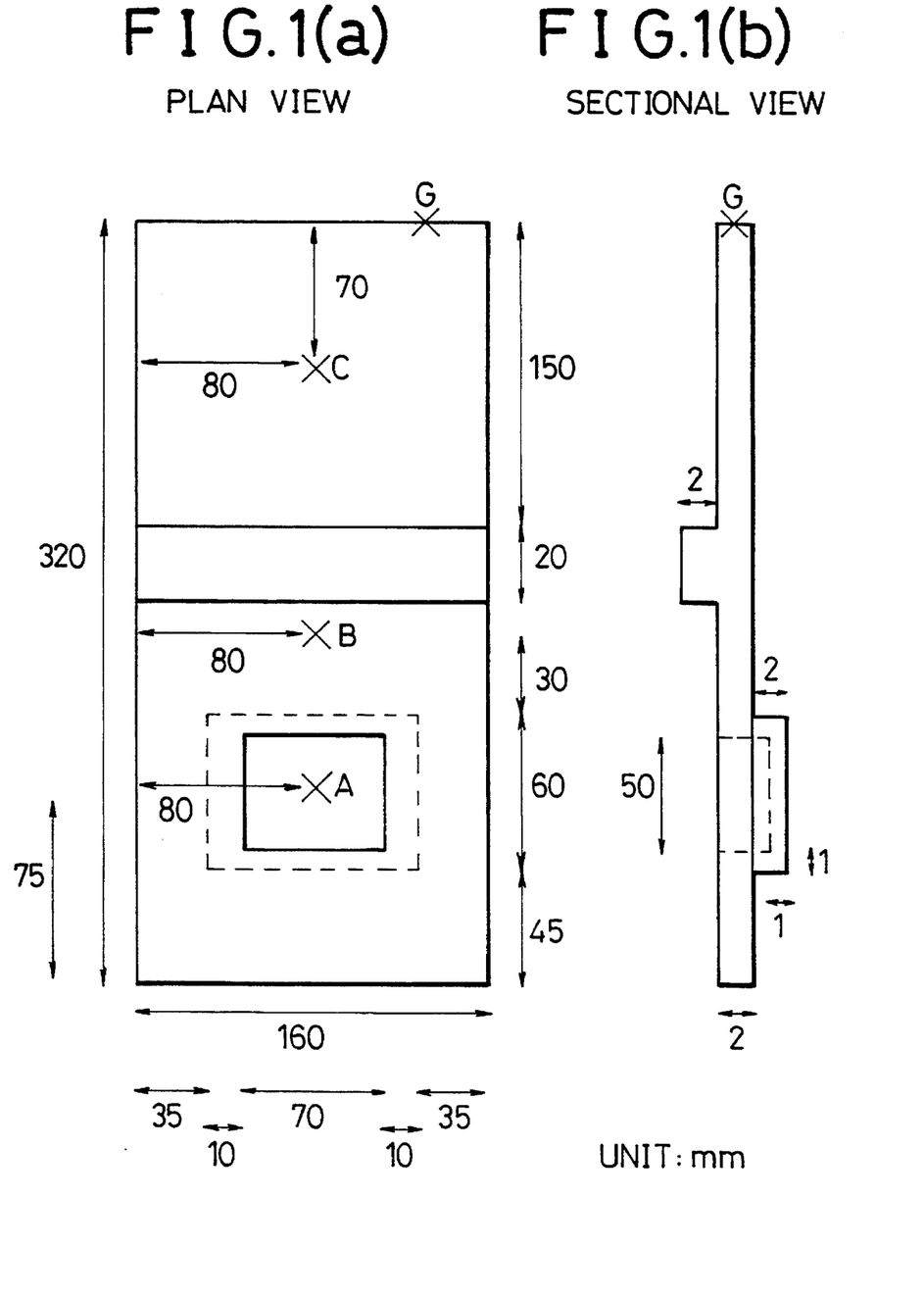

In FIG. 1, a gate portion, i.e., an inlet through which the molten resin was poured into the mold is represented by G. A position A is a position where thickness changes under the influence of the position of the gate portion; a position B is a position in the vicinity of a corner; and a position C is a standard position. In general, there is a tendency that the impact strength increases in the order of the position A, the position B and the position C.

(d) Izod impact strength: This was measured in accordance with JIS K-6871.

(e) Practical impact strength: A drop-weight impact strength test was made to measure impact strengths at the 3 positions (the position A, the position B and the position C) of each test piece having the shape shown in FIG. 1. A tip R of the drop weight was 6.4 mm, and an inner diameter of a deck was 25 mm.

(f) Surface gloss: This was measured in accordance with JIS Z-8741. Light was applied at an incidence angle of 60° to the position C of the molded article having the shape shown in FIG. 1.

EXAMPLES 2 AND 3

Rubber modified styrene resins were prepared by the same procedure as in Example 1, changing the first polymeric material, its feed, polymerization temperature, solid content at the outlet of the first reactor, feed and a composition of the second polymeric material, polymerization temperature, solid content at the outlet of the second reactor, solid content at the outlet of the third reactor and the like. In both the examples, rubber particles were formed in the second reactor. Polymerization conditions and the results of a performance evaluation are shown in Table 1.

COMPARATIVE EXAMPLES 1 AND 2

Rubber modified styrene resins were prepared by the same procedure as in Example 1, changing the first polymeric material, its feed, polymerization temperature, solid content at the outlet of the first reactor, feed and the composition of the second polymeric material, polymerization temperature, solid content at the outlet of the second reactor, solid content at the outlet of the third reactor and the like. In both the examples, rubber particles were formed in the second reactor. The conditions of polymerization and the results of a performance evaluation are shown in Table 2. In Comparative Example 1, the particle diameter of the rubber particles increased, so that impact resistance and surface gloss were both poorer than in Example 1. In Comparative Example 2, the concentration of the rubbery polymer in the first reactor was so high that the viscosity of the polymeric material in the first reactor was high, and thus for the feed of the material and the stirring of the polymeric material, a large load was required, which was impractical. In addition, the unevenness of the impact resistance was very large.

EXAMPLE 4

In experiments of Examples 4 to 6, monomers and a rubbery polymer were added to a second reactor, but ethylbenzene was not added thereto.

Rubber modified styrene resins was prepared by the use of a serial polymerization device having a volume of about 15 liters in which 3 complete mixing type reactors were connected in series. A first step was constituted of a first reactor, and a second step was constituted of a second reactor and a third reactor. A first material comprising 43 parts by weight of styrene, 14 parts by weight of acrylonitrile, 35 parts by weight of ethylbenzene, 8 parts by weight of a rubbery polymer, 0.15 part by weight of t-dodecyl mercaptan and 0.03 part by weight of 1,1-bis(t-butylperoxy)-3,3,5-trimethylcyclohexane was continuously fed to the first reactor at 5.7 kg/hr by the use of a plunger pump, and the monomers were polymerized therein. In this case, a polymerization temperature was adjusted so that the solid content at the outlet of the first reactor, i.e., the amounts of the rubbery polymer and a styrene-acrylonitrile copolymer in a polymeric solution might be 22% by weight with respect to the weight of the polymeric solution. At this time, the polymerization temperature was 90° C. Furthermore, a stirring rotational speed in the reactor was 100 rpm, and the polymerization temperatures were measured by thermocouples arranged at 3 positions of upper, middle and lower positions of the reactor. In this case, the temperatures at the 3 points were controlled in the range of an average ±0.2° C., and it could be presumed that the polymeric solution was uniformly mixed. As the rubbery polymer, there was used the same compound as in Example 1.

In the first reactor, rubbery polymer particles were not formed. In the first reactor, a weight ratio of the rubbery polymer to the styrene-acrylonitrile copolymer was 8:14.

The polymeric solution was continuously taken out from the first reactor, and then continuously fed to the second reactor. Next, a second material comprising 69 parts by weight of styrene, 23 parts by weight of acrylonitrile, 8 parts by weight of the rubbery polymer, 0.15 part by weight of t-dodecyl mercaptan and 0.03 part by weight of 1,1-bis(t-butylperoxy)-3,3,5-trimethylcyclohexane was continuously fed to the second reactor at 4.3 kg/hr by the use of the plunger pump. In the second reactor, the polymerization of the monomers was continuously carried out, and the polymerization temperature was adjusted so that the solid content at the outlet of the second reactor might be 36% by weight with respect to the weight of the polymeric solution. At this time, the polymerization temperature was 100° C. In the second reactor, the rubbery polymer was inverted to a dispersed phase to form the rubbery polymer particles. The polymeric solution continuously drawn from the second reactor was fed to the third reactor, and the polymerization in the third reactor was carried out so that the solid content at the outlet of the third reactor might be 50% by weight. Next, the polymeric solution was passed through a volatile component removal step and an extrusion step to form pellets.

With regard to the thus prepared rubber modified styrene resin, polymerization conditions and the results of analysis and performance evaluation are shown in Table 1.

EXAMPLES 5 AND 6

Rubber modified styrene resins were prepared by the same procedure as in Example 4, changing the first polymeric material, its feed, polymerization temperature, solid content at the outlet of the first reactor, feed and composition of the second polymeric material, polymerization temperature, solid content at the outlet of the second reactor, solid content at the outlet of the third reactor and the like.

However, in Example 6, the composition of the second material was composed of 67.5 parts by weight of styrene, 22.5 parts by weight of acrylonitrile, 10 parts by weight of the rubbery polymer, 0.15 part by weight of t-dodecyl mercaptan and 0.03 part by weight of 1,1-bis(t-butylperoxy)-3,3,5-trimethylcyclohexane.

COMPARATIVE EXAMPLES 3 AND 4

Rubber modified styrene resins were prepared by the same procedure as in Example 1, changing the first polymeric material, its feed, polymerization temperature, solid content at the outlet of the first reactor, feed and composition of the second polymeric material, polymerization temperature, solid content at the outlet of the second reactor, a solid content at the outlet of the third reactor and the like. In both the examples, rubber particles were formed in the second reactor. The conditions of polymerization and the results of a performance evaluation are shown in Table 2. In Comparative Example 3, the concentration of ethylbenzene in the second reactor was low, so that the polymerization rate was high, and it was difficult to adjust the solid content in the polymeric solution in the second reactor. In addition, impact resistance, surface gloss and the fluidity of the resin were poorer than in Example 6, In Comparative Example 4, the concentration of ethylbenzene in the first and second reactors was high, so that the polymerization rate was low, and it was difficult to adjust the solid content in a polymeric solution in the second reactor. In addition, the fluidity of the resin was higher than in the examples, but impact resistance, surface gloss and the fluidity of the resin were poorer than in Example 5, due to the cohesion of the rubber particles formed in the second reactor.

EXAMPLES 7

In experiments of Examples 7 and 8, monomers and ethylbenzene were added to a second polymerization reactor, but rubbery-polymer was not added thereto.

Each rubber modified styrene resin was prepared by the use of a serial polymerization device having a volume of about 15 liters in which 3 complete mixing type reactors were connected in series. A first step was constituted of a first reactor, and a second step was constituted of a second reactor and a third reactor. A first material comprising 69 parts by weight of styrene, 23 parts by weight of acrylonitrile, 8 parts by weight of a rubbery polymer, 0.15 part by weight of t-dodecyl mercaptan and 0.03 part by weight of 1,1-bis(t-butylperoxy)-3,3,5-trimethylcyclohexane was continuously fed to the first reactor at 7.0 kg/hr by the use of a plunger pump, and the monomers were polymerized therein. In this case, a polymerization temperature was adjusted so that the solid content at the outlet of the first reactor, i.e., the amounts of the rubbery polymer and a styrene-acrylonitrile copolymer in a polymeric solution might be 19% by weight with respect to the weight of the polymeric solution. At this time, the polymerization temperature was 85° C. Furthermore, the stirring rotational speed in the reactor was 100 rpm, and the polymerization temperatures were measured by thermocouples arranged at 3 positions of upper, middle and lower positions of the reactor. In this case, the temperatures at the 3 points were controlled in the range of an average ±0.2° C., and it could be presumed that the polymerization solution was uniformly mixed. The same rubbery polymer as in Example 1 was used.

In the first reactor, any rubbery polymer particles were not formed. In the first reactor, a weight ratio of the rubbery polymer to the styrene-acrylonitrile copolymer was 8:11.

The polymeric solution was continuously taken out from the first reactor, and then continuously fed to the second reactor. Next, a second material comprising 18.7 parts by weight of styrene, 6.3 parts of acrylonitrile, 67 parts by weight of ethylbenzene, 8 parts by weight of the rubbery polymer, 0.15 part by weight of t-dodecyl mercaptan and 0.03 part by weight of 1,1-bis(t-butylperoxy)-3,3,5-trimethylcyclohexane was continuously fed to the second reactor at 3.0 kg/hr by the use of the plunger pump. In this case, 1,1-bis(t-butylperoxy)- 3,3,5-trimethylcyclohexane alone was fed through another line. Here, the ratio between the amounts of ethylbenzene in the first reactor and the second reactor (S/T) was 0. In the second reactor, the polymerization of the monomers was continuously carried out, and the polymerization temperature was adjusted so that the solid content at the outlet of the second reactor might be 36% by weight with respect to the weight of the polymeric solution. At this time, the polymerization temperature was 100° C. In the second reactor, the rubbery polymer was inverted to a dispersed phase to form the rubbery polymer particles. The polymeric solution continuously drawn from the second reactor was fed to the third reactor, and the polymerization in the third reactor was carried out so that the solid content at the outlet of the third reactor might be 50% by weight. Next, the polymeric solution was passed through a volatile component removal step and an extrusion step to form pellets.

Polymerization conditions and the results of analysis and performance evaluation of the thus prepared rubber modified styrene resin are shown in Table 1.

EXAMPLE 8

Rubber modified styrene resins was prepared by the same procedure as in Example 7 except that the composition of the first material, the polymerization temperature in the first reactor and the composition of the second material were changed as shown in Table 1. The ratio between the amounts of ethylbenzene in the first reactor and the second reactor (S/T) was 0.5, and rubber particles were formed in the second reactor. The results of the analysis and the performance of the thus obtained resin are shown in Table 1. In this connection, the weight ratio of a rubbery polymer to a styrene-acrylonitrile copolymer in the first reactor of this example was 8:11.

EXAMPLE 9

In experiments of Examples 9 to 12, monomers and ethylbenzene were added to the second polymerization reactor.

Rubber modified styrene resins was prepared by the use of a serial polymerization device in which 3 complete mixing type reactors were connected in series. A first step was constituted of a first reactor, and a second step was constituted of a second reactor and a third reactor. A first material comprising 66.4 parts by weight of styrene, 22.2 parts by weight of acrylonitrile, 11.4 parts by weight of a rubbery polymer, 0.15 part by weight of t-dodecyl mercaptan and 0.03 part by weight of 1,1-bis(t-butylperoxy)-3,3,5-trimethylcyclohexane was continuously fed to the first reactor at 7.0 kg/hr, and the monomers were polymerized therein. In this case, the polymerization temperature was adjusted so that the solid content at the outlet of the first reactor, i.e., the amounts of the rubbery polymer and a styrene-acrylonitrile copolymer in a polymeric solution might be 22.9% by weight with respect to the weight of the polymeric solution. At this time, the polymerization temperature was 81° C. Furthermore, as the rubbery polymer, there was used a styrene-butadiene block copolymer having a viscosity of 11 cP in a styrene solution having a rubbery polymer concentration of 5% by weight at 25° C. In the first reactor, rubbery polymer particles were not formed.

The polymeric solution was continuously taken out from the first reactor, and then continuously fed to the second reactor. Next, a second material comprising 25 parts by weight of styrene, 8.3 parts of acrylonitrile, 66.7 parts by weight of ethylbenzene, 0.15 part by weight of t-dodecyl mercaptan and 0.03 part by weight of 1,1-bis(t-butylperoxy)-3,3,5-trimethylcyclohexane was continuously fed to the second reactor at 3.0 kg/hr. Here, a ratio between the amounts of the rubbery polymer in the first reactor and the second reactor (Y/X) was 0.7, and the ratio between the amounts of the organic solvent in the first reactor and the second reactor (S/T) was 0.0. In the second reactor, the polymerization of the monomers was continuously carried out, and the polymerization temperature was adjusted so that the solid content at the outlet of the second reactor might be 36% by weight with respect to the weight of the polymeric solution. At this time, the polymerization temperature was 100° C. In the second reactor, the rubbery polymer was inverted to a dispersed phase to form the rubbery polymer particles. The polymeric solution continuously drawn from the second reactor was fed to the third reactor, and the polymerization in the third reactor was carried out so that the solid content at the outlet of the third reactor might be 50% by weight. Next, the polymeric solution was passed through a volatile component removal step and an extrusion step to form pellets. With regard to the thus prepared rubber modified styrene resin, polymerization conditions and the results of analysis and performance evaluation are shown in Table 1. This resin was more excellent in surface gloss and impact strength, particularly more excellent in practical impact strength at positions A and B of a molded article shown in FIG. 1, as compared with the results of the undermentioned comparative examples. In this connection, the weight ratio of the rubbery particles to the styrene-acrylonitrile copolymer was 11.4:11.5.

EXAMPLE 10

Rubber modified styrene resins was prepared by the same procedure as in Example 9 except that the composition of the first material, the polymerization temperature in the first reactor and the composition of the second material were changed as shown in Table 1. The ratio between the amounts of a rubbery polymer in the first reactor and the second reactor (Y/X) was 0.7, and the ratio between the amounts of the organic solvent in the first reactor and the second reactor (S/T) was 0.5. Rubber particles were formed in the second reactor. The results of the analysis and the performance of the thus obtained resin are shown in Table 1. In this connection, the weight ratio of the rubbery particles to the styrene-acrylonitrile copolymer formed by this polymerization reaction in the first step was 11.4:11.5.

EXAMPLE 11

Rubber modified styrene resins was prepared by the same procedure as in Example 1 except that the composition of the first material, the feed of the first material, the polymerization temperature in the first reactor, the composition of the second material and the feed of the second material were changed as shown in Table 1. The ratio between the amounts of a rubbery polymer in the first reactor and the second reactor (Y/X) was 0.5, and the ratio between the amounts of an organic solvent in the first reactor and the second reactor (S/T) was 0.0. Rubber particles were formed in the second reactor. The results of the analysis and the performance of the thus obtained resin are shown in Table 1. In this connection, the weight ratio of the rubbery particles to the styrene-acrylonitrile copolymer formed by this polymerization reaction in the first step was 16.0:16.0.

EXAMPLE 12

Rubber modified styrene resins was prepared by the same procedure as in Example 9 except that the composition of the first material, the feed of the first material, the polymerization temperature in the first reactor, the composition of the second material and the feed of the second material were changed as shown in Table 1. The ratio between the amounts of a rubbery polymer in the first reactor and the second reactor (Y/X) was 0.5, and the ratio between the amounts of the organic solvent in the first reactor and the second reactor (S/T) was 0.5. Rubber particles were formed in the second reactor. The results of the analysis and the performance of the thus obtained resin are shown in Table 1. In this connection, the weight ratio of the rubbery particles to the styrene-acrylonitrile copolymer formed by this polymerization reaction in the first step was 16.0:16.0.

COMPARATIVE EXAMPLE 5

Rubber modified styrene resins was prepared by the use of the same polymerization device as in Example 1 without carrying out prepolymerization. A material comprising 54 parts by weight of styrene, 18 parts by weight of acrylonitrile, 20 parts by weight of ethylbenzene, 8 parts by weight of a rubbery polymer, 0.15 part by weight of t-dodecyl mercaptan and 0.03 part by weight of 1,1-bis(t-butylperoxy)-3,3,5-trimethylcyclohexane was continuously fed to the first reactor at 10 kg/hr, and polymerization was carried out at 110° C. so that the solid content at the outlet of the first reactor might be 28% by weight with respect to the weight of a polymeric solution. The composition of the polymeric solution in the first reactor was the same as that of the polymeric solution in the second reactor in Example 1 except for the monomers and the produced copolymer. Rubber particles were formed in the first reactor. It was also noted that surface gloss was lower than in Example 1 and impact resistances particularly at positions A and B shown in FIG. 1 were low. With regard to the thus obtained resin, polymerization conditions and the results of analysis and performance evaluation are shown in Table 1. In this connection, the weight ratio of the rubbery particles to the styrene-acrylonitrile copolymer formed by this polymerization reaction in the first step was 8.0:20.0.

COMPARATIVE EXAMPLE 6

Rubber modified styrene resins was prepared by the same procedure as in Comparative Example 6 except that the polymerization temperature in the first reactor, the solid content at the outlet of the first reactor and the polymerization temperature in the second reactor were changed as shown in Table 2. The same polymeric material as in Comparative Example 6 was used, and monomers were polymerized at 98° C. in the first reactor so that the solid content at the outlet of the first reactor might be 16% by weight with respect to the weight of the polymeric solution, and the monomers were polymerized at 100° C. in the second reactor so that the solid content at the outlet of the second reactor might be 36% by weight with respect to the weight of the polymeric solution. In the first reactor, rubber particles were not formed, and in the second reactor, rubber particles were formed. The diameter of the formed rubber particles was as large as 1.45 μm, and both the impact resistance and the surface gloss of the rubber particles were inferior to those of Example 1. The polymerization conditions of the obtained resin are shown in Table 2, and the results of the analysis and the performance evaluation of the resin are shown in Table 2. In this connection, the weight ratio of the rubbery particles to the styrene-acrylonitrile copolymer formed by this polymerization reaction in the first step was 8.0:8.0.

EXAMPLE 13

The same procedure as in Example 9 was carried out except that an initiator of Example 9 was replaced with 2,2-azobis(2-methylbutyronitrile) and this initiator was put in a first reactor and a second reactor every 0.018 parts by weight thereof. The experimental results are shown in Table 1.

As described above, the present invention is connected with a process for preparing rubber modified styrene resins having a higher impact resistance than in a conventional method, and having remarkably improved surface gloss. Rubber modified styrene resins according to the present invention are applicable to various uses of electric appliances such as electric washing machines, air conditioners, electric refrigerators and audio-visual equipment; general machines such as office automation equipment, telephones, musical instruments and watches; miscellaneous goods such as toys, cosmetic containers and sheets; cars and housing materials. Hence, rubber modified styrene resins of the present invention have an extremely large industrial value.

TABLE 1

| | Unit | \multicolumn{13}{c}{Example} |
| | | 1 | 2 | 3 | 4 | 5 | 6 | 7 | 8 | 9 | 10 | 11 | 12 | 13 |
|---|---|---|---|---|---|---|---|---|---|---|---|---|---|---|
| Composition of the first polymeric material | | | | | | | | | | | | | | |
| Styrene | wt. part | 48 | 45 | 52 | 43 | 43 | 43 | 69 | 61.5 | 66.4 | 58.9 | 63 | 55.5 | 66.4 |
| Acrylonitrile | wt. part | 16 | 15 | 18 | 14 | 14 | 14 | 23 | 20.5 | 22.2 | 19.7 | 21 | 18.5 | 22.2 |
| Ethyl benzene | wt. part | 20 | 20 | 20 | 35 | 35 | 35 | 0 | 10 | 0 | 10 | 0 | 10 | 0 |
| Rubbery polymer | wt. part | 16 | 20 | 10 | 8 | 8 | 8 | 8 | 8 | 11.4 | 11.4 | 16 | 16 | 11.4 |
| Chain transfer agent (TDM) | × 10⁻² | 15 | 15 | 15 | 15 | 15 | 15 | 15 | 15 | 15 | 15 | 15 | 15 | 15 |
| Polymerization initiator | wt. part × 10⁻² | 3 | 3 | 3 | 3 | 3 | 3 | 3 | 3 | 3 | 3 | 3 | 3 | 1.8 |
| Feed amount of the first polymeric material | kg/h | 5 | 4 | 8 | 5.7 | 5.7 | 5.7 | 7 | 7 | 7 | 7 | 5 | 5 | 7 |
| Temperature of the first reactor | °C | 90 | 93 | 88 | 90 | 90 | 90 | 85 | 91 | 81 | 84 | 84 | 87 | 81 |
| Composition of the second polymeric material | | | | | | | | | | | | | | |
| Styrene | wt. part | 60 | 60 | 60 | 69 | 69 | 69 | 18.7 | 36.7 | 25.0 | 42.7 | 45 | 52.5 | 25.0 |
| Acrylonitrile | wt. part | 20 | 20 | 20 | 23 | 23 | 23 | 6.3 | 12.3 | 8.3 | 14.3 | 15 | 17.5 | 8.3 |
| Ethyl benzene | wt. part | 20 | 20 | 20 | 0 | 0 | 0 | 67 | 43 | 66.7 | 43.0 | 40 | 30 | 66.7 |
| Rubbery polymer | wt. part | 0 | 0 | 0 | 8 | 8 | 8 | 8 | 8 | 0 | 0 | 0 | 0 | 0 |
| Chain transfer agent (TDM) | × 10⁻² | 15 | 15 | 15 | 15 | 15 | 15 | 15 | 15 | 15 | 15 | 15 | 15 | 15 |
| Polymerization initiator | wt. part × 10⁻² | 3 | 3 | 3 | 3 | 3 | 3 | 3 | 3 | 3 | 3 | 3 | 3 | 1.8 |
| Feed amount of the second polymeric material | kg/h | 5 | 6 | 2 | 4.3 | 2.3 | 7.6 | 3 | 3 | 3 | 3 | 3 | 3 | 3 |
| Composition of the inlet of the second reactor | | | | | | | | | | | | | | |
| Stylene-acrlonitrile copolymer | wt. part | 8 | 8 | 8 | 8 | 10 | 6 | 8 | 8 | 8 | 8 | 8 | 8 | 8 |
| Styrene | wt. part | 48 | 48 | 48 | 48 | 43 | 53 | 48 | 48 | 48 | 48 | 48 | 48 | 48 |
| Acrylonitrile | wt. part | 16 | 16 | 16 | 16 | 14 | 18 | 16 | 16 | 16 | 16 | 16 | 16 | 16 |
| Ethyl benzene | wt. part | 20 | 20 | 20 | 20 | 25 | 15 | 20 | 20 | 20 | 20 | 20 | 20 | 20 |
| Rubbery polymer | wt. part | 8 | 8 | 8 | 8 | 8 | 8 | 8 | 8 | 8 | 8 | 8 | 8 | 8 |
| Chain transfer agent (TDM) | × 10⁻² | 15 | 15 | 15 | 15 | 15 | 15 | 15 | 15 | 15 | 15 | 15 | 15 | 15 |
| Polymerization initiator | wt. part × 10⁻² | 3 | 3 | 3 | 3 | 3 | 3 | 3 | 3 | 3 | 3 | 3 | 3 | 3 |
| Temperature of the second reactor | °C | 100 | 100 | 100 | 100 | 98 | 102 | 100 | 100 | 100 | 100 | 100 | 100 | 100 |
| Amount of the first polymeric materials/Amount of the second polymeric material | wt. % | 100 | 150 | 25 | 75 | 40 | 133 | 43 | 43 | 43 | 43 | 100 | 100 | 43 |
| Content of solid materials | | | | | | | | | | | | | | |
| Outlet of the first reactor | wt. % | 32 | 40 | 24 | 22 | 22 | 22 | 19 | 19 | 22.9 | 22.9 | 32 | 32 | 22.9 |
| Outlet of the second reactor | wt. % | 36 | 36 | 36 | 36 | 36 | 36 | 36 | 36 | 36 | 36 | 36 | 36 | 36 |
| Outlet of the third reactor | wt. % | 50 | 50 | 50 | 50 | 50 | 50 | 50 | 50 | 50 | 50 | 50 | 50 | 50 |
| State of rubbery particles | | | | | | | | | | | | | | |
| The first reactor | x; Not phase inversion | x | x | x | x | x | x | x | x | x | x | x | x | x |
| The second reactor | o; Phase inverstion | o | o | o | o | o | o | o | o | o | o | o | o | o |
| Content of rubbery polymer in the first reactor (X) | wt. % | 16 | 20 | 20 | 8 | 8 | 8 | 8 | 8 | 11.4 | 11.4 | 16 | 16 | 11.4 |
| Content of rubbery polymer in the second reactor (Y) | wt. % | 8 | 8 | 8 | 8 | 8 | 8 | 8 | 8 | 8.0 | 8.0 | 8 | 8 | 8.0 |
| Y/X | — | 0.5 | 0.4 | 0.8 | 1 | 1 | 1 | 1 | 1 | 0.7 | 0.7 | 0.5 | 0.5 | 0.7 |

TABLE 1-continued

| | Unit | Example 1 | 2 | 3 | 4 | 5 | 6 | 7 | 8 | 9 | 10 | 11 | 12 | 13 |
|---|---|---|---|---|---|---|---|---|---|---|---|---|---|---|
| Content of organic solvent in the first reactor (S) | wt. % | 20 | 20 | 20 | 35 | 35 | 35 | 0 | 10 | 0 | 10 | 0 | 10 | 0 |
| Content of organic solvent in the second reactor (T) | wt. % | 20 | 20 | 20 | 20 | 25 | 15 | 20 | 20 | 20 | 20 | 20 | 20 | 20 |
| S/T | — | 1 | 1 | 1 | 1.75 | 1.4 | 2.33 | 0 | 0.5 | 0 | 0.5 | 0 | 0.5 | 0 |
| Rubbery polymer content of the resin | wt. % | 16.1 | 16.0 | 15.9 | 15.9 | 16.0 | 16.1 | 16.1 | 15.9 | 15.9 | 16.0 | 15.8 | 16.2 | 16.0 |
| Average diameter of rubber particles | μm | 0.52 | 0.55 | 0.67 | 0.51 | 0.72 | 0.53 | 0.48 | 0.50 | 0.49 | 0.51 | 0.52 | 0.53 | 0.59 |
| Surface gloss | % | 87.7 | 85.2 | 81.3 | 95.2 | 88.1 | 87.8 | 89.3 | 85.5 | 95.1 | 93.0 | 93.9 | 93.1 | 75.6 |
| Surface gloss (the position A) | % | 69.7 | 68.6 | 64.5 | 77.8 | 70.4 | 70.2 | 72.4 | 69.3 | 79.0 | 79.4 | 80.1 | 79.7 | 66.2 |
| Surface gloss (the position B) | % | 78.8 | 76.9 | 72.8 | 89.5 | 83.5 | 77.9 | 79.7 | 77.2 | 89.8 | 87.5 | 88.8 | 87.2 | 71.4 |
| Surface gloss (the position C) | % | 87.7 | 85.2 | 81.3 | 95.2 | 88.1 | 87.8 | 89.3 | 85.5 | 95.1 | 93.0 | 93.9 | 93.1 | 75.6 |
| Izod impact strength | kg·cm/cm | 12.4 | 12.7 | 13.2 | 13.5 | 14.1 | 13.6 | 19.4 | 16.1 | 26.3 | 23.2 | 24.8 | 24.2 | 15.9 |
| Practical impact strength (the position A) | kg·cm | 69 | 66 | 70 | 73 | 77 | 75 | 68 | 68 | 85 | 81 | 84 | 82 | 65 |
| Practical impact strength (the position B) | kg·cm | 83 | 84 | 87 | 88 | 83 | 86 | 85 | 79 | 97 | 91 | 95 | 90 | 77 |
| Practical impact strength (the position C) | kg·cm | 91 | 92 | 95 | 95 | 93 | 94 | 96 | 85 | 105 | 100 | 103 | 101 | 82 |
| Flow rate of resin (MFI) | g/10 min. | 2.1 | 2.2 | 2.1 | 4.1 | 4.9 | 3.0 | 1.5 | 1.7 | 1.3 | 1.5 | 1.4 | 1.6 | 1.3 |

TABLE 2

|  |  | Unit | Comparative Example | | | | | |
|---|---|---|---|---|---|---|---|---|
|  |  |  | 1 | 2 | 3 | 4 | 5 | 6 |
| Composition of the first polymeric material | Styrene | wt. part | 53.7 | 37.5 | 43 | 43 | 54 | 54 |
|  | Acrylonitrile | wt. part | 17.9 | 12.5 | 14 | 14 | 18 | 18 |
|  | Ethyl benzene | wt. part | 20.0 | 20.0 | 35 | 35 | 20 | 20 |
|  | Rubbery polymer | wt. part | 8.4 | 30.0 | 8 | 8 | 8 | 8 |
|  | Chain transfer agest (TDM) | $\times 10^{-2}$ wt. part | 15 | 15 | 15 | 15 | 15 | 15 |
|  | Polymerization initiator | $\times 10^{-2}$ wt. part | 3 | 3 | 3 | 3 | 3 | 3 |
| Feed amount of the first polymeric material |  | kg/h | 9.5 | 2.7 | 5.7 | 5.7 | 10 | 10 |
| Temperature of the first reactor |  | °C. | 99 | 98 | 90 | 90 | 110 | 98 |
| Composition of the second polymeric material | Styrene | wt. part | 60 | 60 | 69 | 69 | 0 | 0 |
|  | Acrylonitrile | wt. part | 20 | 20 | 23 | 23 | 0 | 0 |
|  | Ethyl benzene | wt. part | 20 | 20 | 0 | 0 | 0 | 0 |
|  | Rubbery polymer | wt. part | 0 | 0 | 8 | 8 | 0 | 0 |
|  | Chain transfer agent (TDM) | $\times 10^{-2}$ wt. part | 15 | 15 | 15 | 15 | 0 | 0 |
|  | Polymerization initiator | $\times 10^{-2}$ wt. part | 3 | 3 | 3 | 3 | 0 | 0 |
| Feed amount of the second polymeric material |  | kg/h | 0.5 | 6.3 | 17.1 | 0.34 | 0 | 0 |
| Composition of the inlet of the second reactor | Stylene-acrylonitrile copolymer | wt. part | 8 | 8 | 2.0 | 13.2 | 20 | 8 |
|  | Styrene | wt. part | 48 | 48 | 60.9 | 34.3 | 39 | 48 |
|  | Acrylonitrile | wt. part | 16 | 16 | 20.3 | 11.5 | 13 | 16 |
|  | Ethyl benzene | wt. part | 20 | 20 | 8.8 | 33.0 | 20 | 20 |
|  | Rubbery polymer | wt. part | 8 | 8 | 8 | 8 | 8 | 8 |
|  | Chain transfer agent (TDM) | $\times 10^{-2}$ wt. part | 15 | 15 | 15 | 15 | 15 | 15 |
|  | Polymerization initiator | $\times 10^{-2}$ wt. part | 3 | 3 | 3 | 3 | 3 | 3 |
| Temperature of the second reactor |  | °C. | 100 | 100 | 115 | 111 | 90 | 100 |
| Amount of the first polymeric materials/Amount of the second polymeric material |  | wt % | 5 | 233 | 300 | 6 | 0 | 0 |
| Content of solid materials | Outlet of the first reactor | wt. % | 17 | 60 | 22 | 22 | 28 | 16 |
|  | Outlet of the second reactor | wt. % | 36 | 36 | 36 | 36 | 36 | 36 |
|  | Outlet of the third reactor | wt. % | 50 | 50 | 50 | 50 | 50 | 50 |
| State of rubbery particles | The first reactor | x; Not phase inversion | x | x | x | x | o | x |
|  | The second reactor | o; Phase inverstion | o | o | o | o | x | o |
| Content of rubbery polymer in the first reactor (X) |  | wt. % | 8.4 | 30 | 8 | 8 | 8 | 8 |
| Content of rubbery polymer in the second reactor (Y) |  | wt. % | 8.0 | 8 | 8 | 8 | 8 | 8 |
| Y/X |  | — | 0.95 | 0.27 | 1 | 1 | 1 | 1 |
| Content of organic solvent in the first reactor (S) |  | wt. % | 20 | 20 | 35.0 | 35.0 | 20 | 20 |
| Content of organic solvent in the second reactor (T) |  | wt. % | 20 | 20 | 8.75 | 33.0 | 20 | 20 |
| S/T |  | — | 1 | 1 | 4.0 | 1.06 | 1 | 1 |
| Rubbery polymer content of the resin |  | wt. % | 16.0 | 15.8 | 15.9 | 16.1 | 15.9 | 16.1 |
| Average diameter of rubber particles |  | μm | 0.96 | 0.79 | 0.89 | 1.95 | 0.50 | 1.45 |
| Surface gloss |  | % | 67.4 | 76.7 | 63.3 | 69.9 | 87.9 | 59.9 |
| Surface gloss (the position A) |  | % | 54.2 | 53.3 | 50.7 | 57.2 | 69.3 | 46.8 |
| Surface gloss (the position B) |  | % | 61.5 | 62.5 | 57.4 | 63.5 | 77.2 | 52.6 |
| Surface gloss (the position C) |  | % | 67.4 | 76.7 | 63.3 | 69.9 | 87.9 | 59.9 |
| Izod impact strength |  | kg · cm/cm | 10.9 | 10.2 | 9.6 | 8.5 | 11.2 | 11.5 |
| Practical impact strength (the position A) |  | kg · cm | 27 | 26 | 25 | 22 | 23 | 33 |
| Practical impact strength (the position B) |  | kg · cm | 54 | 53 | 47 | 50 | 55 | 58 |
| Practical impact strength (the position C) |  | kg · cm | 73 | 70 | 58 | 69 | 71 | 75 |
| Flow rate of resin (MFI) |  | g/10 min. | 2.2 | 2.3 | 1.3 | 5.2 | 2.1 | 2.5 |

What is claimed is:

1. A process for continuously preparing rubber modified styrene resin by polymerizing styrene monomer and acrylonitrile monomer, or styrene monomer, acrylonitrile monomer and unsaturated compound monomer capable of copolymerizing with the styrene monomer and acrylonitrile monomer in the presence of a rubbery polymer having a viscosity of 3 to 200 cP in a 5% by weight styrene solution at 25° C. in a continuous mass polymerization method and/or a solution polymerization method by the use of a serial polymerization device comprising two or more reactors whereby a styrene-acrylonitrile copolymer forms a continuous phase and rubbery polymer particles form a dispersed phase, said rubbery polymer and said monomers being used as process materials; said process for continuously preparing rubber modified styrene resin comprising a first step of feeding process material to the first reactor to carry out the polymerization of the monomers under conditions where the rubbery polymer is not substantially inverted to the dispersed phase, and a second step of adding process material to the second and any later reactors to continuously carry out the polymerization of the monomers and to thus invert the rubbery polymer to the dispersed phase, wherein the amount of the process material added in the second step relative to the amount of process material added in the first step is in the range of from 10 to 220% by weight.

2. The process for continuously preparing rubber modified styrene resin of claim 1 wherein the amount of process material added to the second step relative to the amount of process material added in the first step is in the range of from 25 to 220% by weight.

3. The process for continuously preparing rubber modified styrene resin of claim 1 wherein the process material added in the second step comprises at least one of an inert organic solvent and a material selected from rubbery polymer, styrene monomer and acrylonitrile monomer, or styrene monomer, acrylonitrile monomer and an unsaturated compound monomer capable of copolymerizing with the styrene monomer and acrylonitrile monomer.

4. The process for continuously preparing rubber modified styrene resin of claim 1 wherein the process material added to the second step is styrene monomer and acrylonitrile monomer, or styrene monomer, acrylonitrile monomer and an unsaturated compound monomer capable of copolymerizing with the styrene monomer and acrylonitrile monomer.

5. The process for continuously preparing rubber modified styrene resin of claim 1 wherein the process material added to the second step is an inert organic solvent.

6. The process for continuously preparing rubber modified styrene resin of claim 1 wherein the rubbery polymer has a viscosity of 3 to 100 cP in a 5% by weight styrene solution at 25° C.

7. The process for continuously preparing rubber modified styrene resin of claim 1 wherein the continuous polymerization is carried out in the presence of a polymerization initiator.

8. The process for continuously preparing rubber modified styrene resin of claim 1 wherein in the first step, 0.001 to 2.0 parts by weight of an organic peroxide is added to 100 parts by weight of the monomers, and in the second step, 0 to 1.5 parts by weight of the organic peroxide is added to 100 parts by weight of the monomers.

9. The process for continuously preparing rubber modified styrene resin of claim 3 wherein the polymeric material added to the second step comprises rubbery polymer.

10. The process for continuously preparing rubber modified styrene resin of claim 1 wherein the rubbery polymer particles have an average particle diameter in the range of from 0.2 to 0.9 μm.

11. A process for continuously preparing rubber modified styrene resin by polymerizing styrene monomer and acrylonitrile monomer, or styrene monomer, acrylonitrile monomer and an unsaturated compound monomer capable of copolymerizing with the styrene monomer and acrylonitrile monomer in the presence of a rubbery polymer having a viscosity of 3 to 200 cP in a 5% by weight styrene solution at 25° C. in a continuous mass polymerization method and/or a solution polymerization method by the use of a serial polymerization device comprising two or more reactors whereby a styrene-acrylonitrile copolymer forms a continuous phase and rubbery polymer particles form a dispersed phase, said rubbery polymer and said total monomers being used as process materials; said process for continuously preparing rubber modified styrene resin comprising a first step of feeding process material to the first reactor to carry out the polymerization of the monomers under conditions where the rubbery polymer is not substantially inverted to the dispersed phase, and a second step of adding process material to the second and any later reactors to continuously carry out the polymerization of the monomers and to thus invert the rubbery polymer to the dispersed phase, wherein the process meets formula (I)

$$0.3 \leq Y/X \leq 0.9 \qquad (I)$$

wherein the amount of the rubbery polymer in the process material of the first step is X% by weight, and the amount of the rubbery polymer in the process material of the second step is Y% by weight.

12. A process for continuously preparing rubber modified styrene resin by polymerizing styrene monomer and acrylonitrile monomer, or styrene monomer, acrylonitrile monomer and an unsaturated compound monomer capable of copolymerizing with the styrene monomer and acrylonitrile monomer in the presence of an inert organic solvent in accordance with a continuous mass polymerization method and/or a solution polymerization method by the use of a serial polymerization device comprising two or more reactors whereby a styrene-acrylonitrile copolymer forms a continuous phase and rubbery polymer particles form a dispersed phase, said rubbery polymer having a viscosity of 3 to 200 cP in a 5% by weight styrene solution at 25° C., and said rubbery polymer, said monomers and the inert organic solvent being used as process materials; said process for continuously preparing rubber modified styrene resins comprising a first step of feeding process material to the first reactor to carry out the polymerization of the monomers under conditions where the rubbery polymer is not substantially inverted to the dispersed phase, and a second step of adding the monomers as process material to the second and any later reactors to continuously carry out the polymerization of the monomers and to thus invert the rubbery polymer to the dispersed phase wherein the process meets formula (II)

$$1.1 \leq S/T \leq 2.5 \qquad (II)$$

wherein the amount of the inert organic solvent in the process material of the first step is S% by weight, and the amount of the inert organic solvent in the process material in the second step is T% by weight.

13. A process for continuously preparing rubber modified styrene resin by polymerizing styrene monomer and acrylonitrile monomer, or styrene monomer, acrylonitrile monomers and an unsaturated compound monomer capable of copolymerizing with the styrene monomer and acrylonitrile monomer in the presence of an inert organic solvent in accordance with a continuous mass polymerization method and/or a solution polymerization method by the use of a serial polymerization device comprising two or more reactors, whereby a styrene-acrylonitrile copolymer forms a continuous phase and rubbery polymer particles form a dispersed phase, said rubbery polymer having a viscosity of 3 to 200 cP in a 5% by weight styrene solution at 25° C., and said rubbery polymer, said monomers and said inert organic solvent being used as process materials; said process for continuously preparing rubber modified styrene resins comprising a first step of feeding the process material to the first reactor to carry out the polymerization of the monomers under conditions where the rubbery polymer is not substantially inverted to the dispersed phase, and a second step of adding the inert organic solvent process material to the second and any later reactors to continuously carry out the polymerization of the monomers and to thus invert the rubbery polymer to the dispersed phase wherein the process meets formula (III)

$$0 \leq S/T \leq 0.6 \qquad \text{(III)}$$

wherein the amount of the inert organic solvent in the process material of the first step is S% by weight, and the amount of the inert organic solvent in the process material in the second step is T% by weight.

14. The process for continuously preparing rubber modified styrene resin of claim 13 wherein the process meets the formula (VI)

$$4 \leq Y \leq 20 \qquad \text{(VI)}$$

wherein the amount of the rubbery polymer in the second step is Y% by weight.

15. The process for continuously preparing rubber modified styrene resin of claim 13 wherein the process meets the formula (VII)

$$5 \leq T \leq 50 \qquad \text{(VII)}.$$

16. A process for continuously preparing rubber modified styrene resin by polymerizing styrene monomer and acrylonitrile monomer or styrene monomer, acrylonitrile monomer and an unsaturated compound monomer capable of copolymerizing with the styrene monomer and acrylonitrile monomer in the presence of an inert organic solvent in accordance with a continuous mass polymerization method and/or a solution polymerization method by the use of a serial polymerization device comprising two or more reactors, whereby a styrene-acrylonitrile copolymer forms a continuous phase and rubbery polymer particles form a dispersed phase, said rubbery polymer having a viscosity of 3 to 200 cP in a 5% by weight styrene solution at 25° C., said rubbery polymer, said monomers and said inert organic solvent being used as process materials; said process for continuously preparing rubber modified styrene resins comprising a first step of feeding the process material to the first reactor to carry out the polymerization of the monomers under conditions where the rubbery polymer is not substantially inverted to the dispersed phase, and a second step of adding the monomers and the inert organic solvent as process material to the second and any later reactors to continuously carry out the polymerization of the monomers and to thus invert the rubbery polymer to the dispersed phase wherein the process meets formula (IV)

$$0.3 \leq Y/X \leq 0.9 \qquad \text{(IV)}$$

wherein the amount of the rubbery polymer in the process material of the first step is X% by weight, and the amount of the rubbery polymer in the process material of the second step is Y% by weight and wherein the process meets formula (V)

$$0 \leq S/T \leq 0.6 \qquad \text{(V)}$$

wherein the amount of the inert organic solvent in the process material of the first step is S% by weight, and the amount of the inert organic solvent in the process material of the second step is T% by weight.

17. The process for continuously preparing rubber modified styrene resin of claim 16 wherein the process meets the formula (VI)

$$4 \leq Y \leq 20 \qquad \text{(VI)}.$$

18. The process for continuously preparing rubber modified styrene resin of claim 16 wherein the process meets the formula (VII)

$$5 \leq T \leq 50 \qquad \text{(VII)}.$$

* * * * *